United States Patent [19]
Yen

[11] Patent Number: 5,914,037
[45] Date of Patent: Jun. 22, 1999

[54] FILTER DEVICE FOR A WATER FILTER

[76] Inventor: Chiu-Sen Yen, 4F, No. 17, Alley 5, Lane 188, Sec. 1, Wen Hua Road, Panchiao, Taipei, Taiwan

[21] Appl. No.: 08/977,195

[22] Filed: Nov. 24, 1997

[51] Int. Cl.$^6$ .......................... B01D 27/10; B01D 35/153
[52] U.S. Cl. ............................................ 210/234; 210/235
[58] Field of Search .................................... 210/234, 235, 210/435

[56] References Cited

U.S. PATENT DOCUMENTS

| | | | |
|---|---|---|---|
| 2,431,782 | 12/1947 | Walton et al. | 210/183 |
| 2,625,272 | 1/1953 | Arvintz et al. | 210/166 |
| 2,978,107 | 4/1961 | Gutkowski et al. | 210/235 |
| 3,715,032 | 2/1973 | Nicko | 210/133 |
| 3,852,196 | 12/1974 | Szpur | 210/133 |
| 4,077,876 | 3/1978 | Southall | 210/136 |
| 4,222,875 | 9/1980 | Sikula, Jr. | 210/235 |
| 5,049,269 | 9/1991 | Shah | 210/234 |
| 5,486,288 | 1/1996 | Stanford et al. | 210/235 |
| 5,560,824 | 10/1996 | Sann et al. | 210/234 |
| 5,591,332 | 1/1997 | Reid et al. | 210/235 |
| 5,607,582 | 3/1997 | Yamazaki et al. | 210/234 |
| 5,753,107 | 5/1998 | Magnusson et al. | 210/109 |
| 5,753,111 | 5/1998 | Patton et al. | 210/167 |

*Primary Examiner*—David A. Reifsnyder

[57] ABSTRACT

A filter device for a water filter includes a coupling device and a filter cartridge. A water inlet opening and a water outlet opening are formed on the coupling device. The coupling device has an inner casing with a reversed cone shaped through hole in the center. A valve member controlled by an elastic element is configured within the coupling device. The valve member, which includes a hollow rod with through holes formed on the side wall, completely blocks the cone shaped through hole if no filter cartridge is connected. When the filter cartridge is securely fastened to the coupling device, the elastic element is compressed so as to form a water inlet path from the water inlet opening through the coupling device, the valve member and the filter cartridge. A separate water outlet path from the filter cartridge through the coupling device to the water outlet opening provides filtered water ready for drinking.

4 Claims, 3 Drawing Sheets

FILTER DEVICE FOR A WATER FILTER

FIELD OF THE INVENTION

The present invention relates generally to a filter apparatus of a water filter, and more particularly to a water filter apparatus having a filter cartridge that turns off water supply automatically if the filter cartridge is not properly secured with its coupling device.

BACKGROUND OF THE INVENTION

A conventional water filter apparatus mainly comprises a filer cartridge and a coupling device. The coupling device is placed between a water supply and the filter cartridge for connecting the water supply to the filter cartridge. There are two openings in the coupling device. One is a water inlet opening and the other is a water outlet opening. The water inlet opening is connected to a water tap and the water outlet opening is connected to another independent water supply tap where the filter cartridge is placed underneath the coupling device.

After turning on the water tap for inserting water into the coupling device, drinkable water comes out of the independent water supply tap through the filtering material of the filter cartridge. In a conventional assembly of the coupling device and the filter cartridge, an outer thread is formed on the outer casing of the filter cartridge and an inner thread is formed on the coupling device. By firmly and securely fastening the filter cartridge to the coupling device, water flows through the filter cartridge via the coupling device.

The conventional assembly of the coupling device and the filter cartridge has at least the following disadvantages:

1. If the inner thread of the filter cartridge and the outer thread of the coupling device are not tightly coupled with each other, water may leak.
2. If the connection between the filter cartridge and the coupling device is loose, the filter cartridge may fall off when the water pressure is suddenly increased.
3. In the process of replacing the filter cartridge, a user must remember to turn off the water supply. Otherwise, the water runs out widely.

SUMMARY OF THE INVENTION

It is a principal object of the present invention to provide a newly designed construction for the filter cartridge of a water filter for automatically shutting off water supply when the filter cartridge is removed or loosened.

According to this invention, the filter device comprises a coupling device and a filter cartridge. The coupling device has an outer casing, an inner casing and a cover body. A water inlet opening and a water outlet opening are formed on the cover body. The inner casing has a cone shaped through hole in the center. The coupling device also includes a valve member that has a hollow rod on which side-wall through holes are formed. The valve member controlled by an elastic element completely blocks the through hole if no filter cartridge is connected.

When a filter cartridge is connected, the elastic element is compressed to open the cone shaped through hole. By means of the side-wall through holes of the hollow rod and the cone shaped through hole, a water inlet path is formed in the coupling device so that water can be inserted into the filter cartridge and filtered by the filtering material in the cartridge. A water outlet is also formed through the coupling device to supply filtered water.

DETAILED DESCRIPTION OF THE PREFERRED EMBODIMENT

Figure 1:
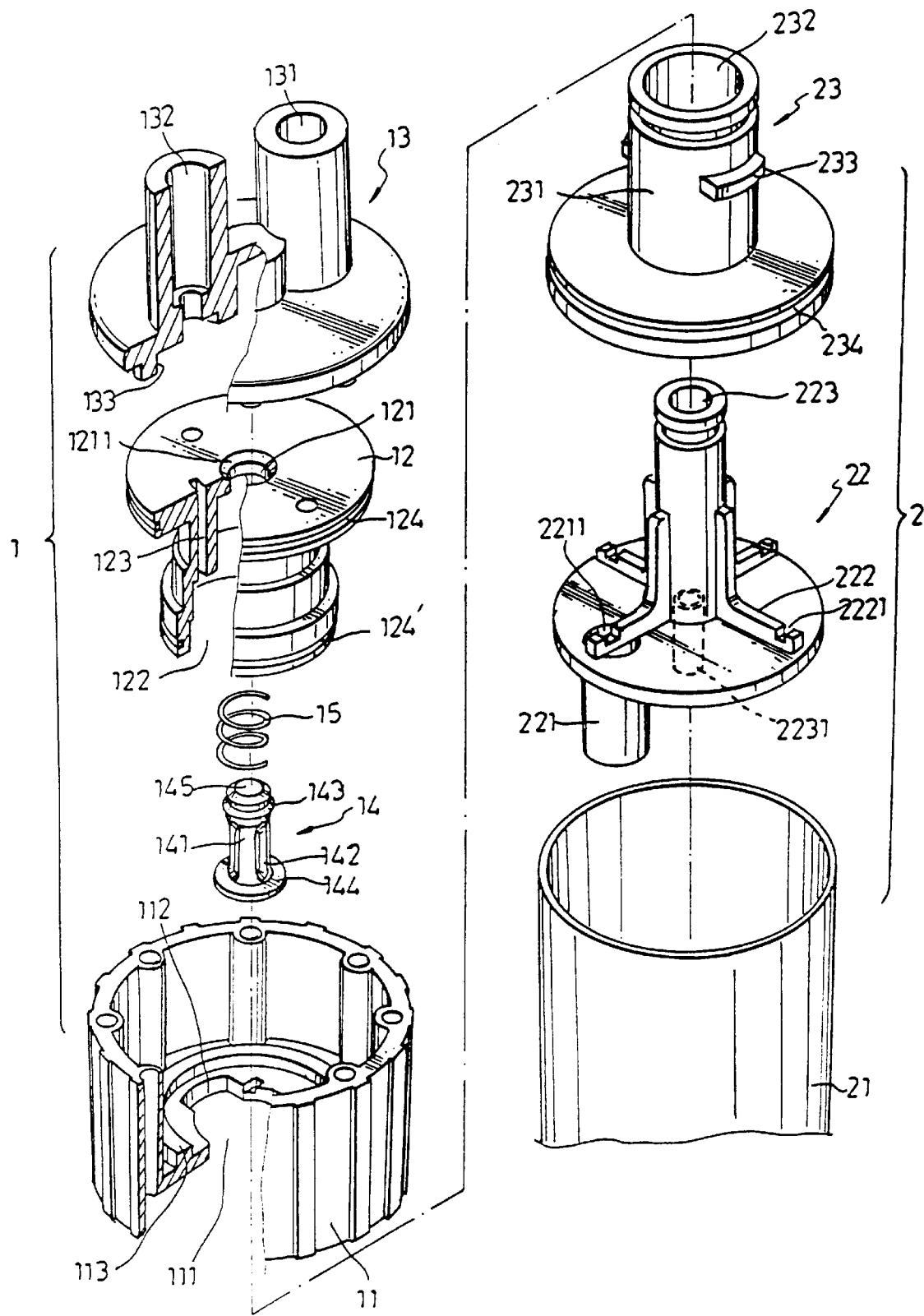
FIG. 1 is an exploded view of the construction of the essential elements in the filter device according to the present invention.

With reference to the drawings and in particular to FIG. 1, the filter device of a water filter in accordance with the present invention comprises a coupling device 1 and a filter cartridge 2. The embodiment of the coupling device 1 includes an outer cylindrical casing 11, an inner cylindrical casing 12, a cover body 13, a valve member 14 and an elastic element 15. The outer casing 11 has one end opened and the other end defining a base with a hole 111 located in its center. A plurality of grooves 112 are formed on the base adjacent to the hole 111. An annular flange 113 surrounding the hole 111 and the grooves 112 is formed on the base. The annular flange 113 protrudes above the base inside the outer casing. A hollow interior space is established inside the outer cylindrical casing 11.

The inner casing 12, which is to be inserted to the interior space of the outer casing 11, also has a hollow interior space 122. A plate member, which is sized to fit into the interior space of the outer casing 11, is mounted on one end of the inner casing 12. A reversed cone shaped central through hole 121 is formed at the center of the plate. The inner casing 12 further comprises a hole 123 which goes through the plate member into the hollow interior space 122. O-rings 124 and 124' are placed on the plate member and the outer surface of the inner casing 12.

The valve member 14 is made of a hollow rod 141. An inner thread is formed in the inner surface of the hollow rod 141. An annular plate is attached to one end of the valve member 14 to form a flange 144. A threaded head part 145 has a conical structure which can be screwed onto the hollow rod 141 with the head part 145 on one side of the plate member of the inner casing 12 and the hollow rod 141 on the other side to form the valve member 14 so that the cone shaped central through hole can be blocked. A plurality of side-wall through holes 142 are formed on the annular wall of the rod 141. An O-ring 143 is affixed on the head part 145.

Figure 2:
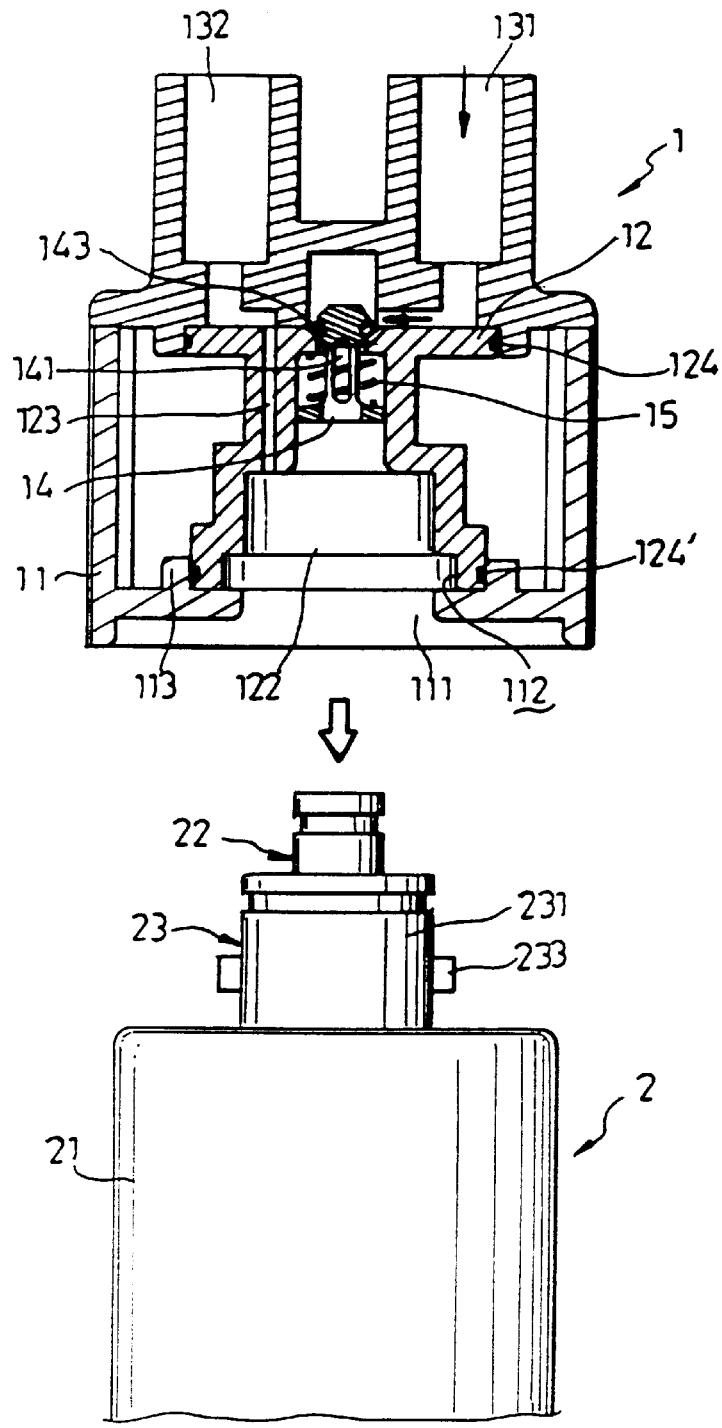
FIG. 2 is a cross-sectional view showing the filter cartridge and the coupling device before they are engaged according to the present invention.

An elastic element 15, which has a diameter larger than that of the hollow rod 141 but smaller than that of the flange 144, is placed on the valve member 14 as shown in FIG. 2. The head part 145 of the valve member 14 is then inserted to the cone shaped central through hole 121 and screwed onto the hollow rod 141. The two conical structures firmly coupled with each other together with the O-ring 143. A preferred example of the elastic element 15 is a spiral spring. By means of the head part 145 and the O-ring 143, the cone shaped through hole 121 is completely blocked if the spiral spring is not compressed.

The cover body 13 comprises a water inlet opening 131 and an water outlet opening 132 on one side and an annular flange 133 on the other side. The inner casing 12 is affixed to the cover body 13 by plugging the plate member of the inner casing 12 inside the annular flange 133. The inner surface of the annular flange 133 is attached to the O-ring 124. The inner casing 12 is also inserted into the outer casing 11 with the O-ring 124' firmly attached to the annular flange 113 on the base of the outer casing 11. The outer casing 11 is therefore covered up by the cover body 13 to form the coupling device 1.

Figure 3:
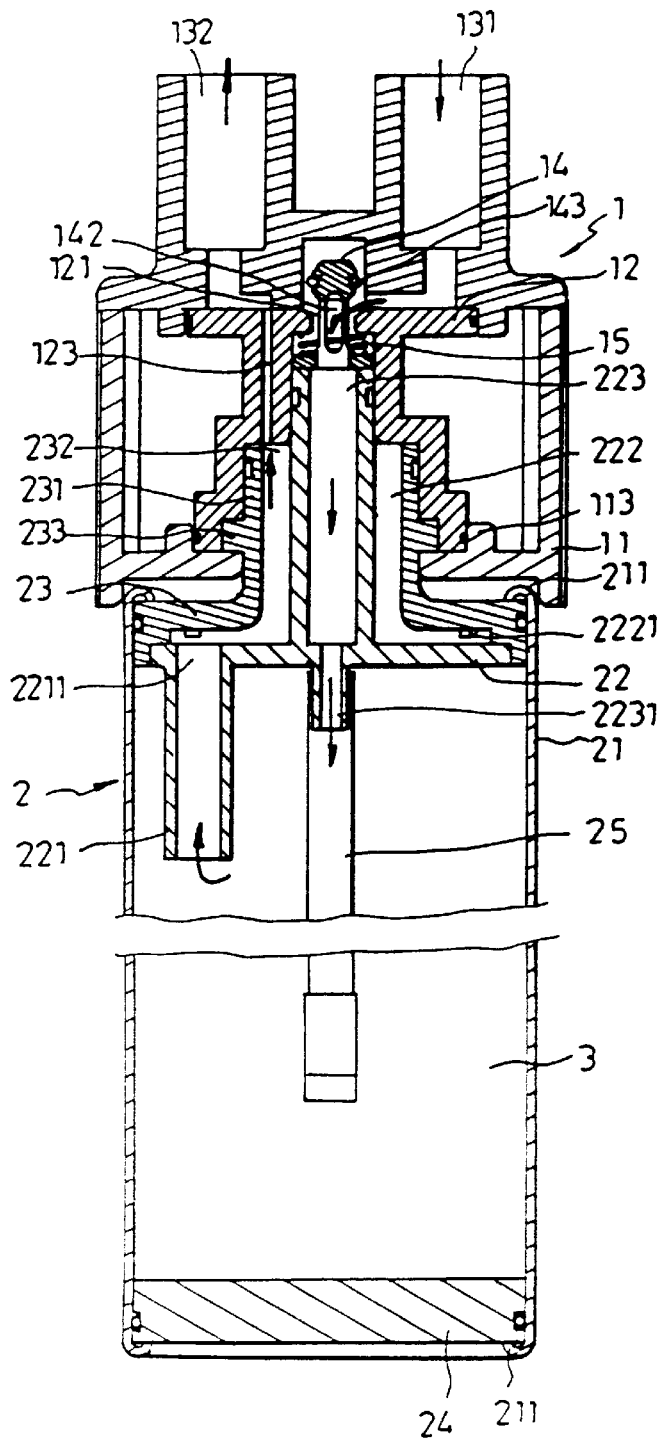
FIG. 3 is a cross-sectional view showing the engaged filter cartridge and coupling device according to the present invention.

With reference to FIGS. 1 and 3, the filter cartridge 2 comprises a filter cylinder 21, a set body 22, a fixation device 23 and a base body 24. The filter cylinder 21 has a hollow interior for the placement of a filter material 3. The bottom end of the cylinder 21 is connected to the base body 24. The set body 22 is constructed on a circular plate having a through hole at the center. A tubular structure defined as a water inlet tube 223 extends out of the circular plate of the set body 22 on both sides so that water may be supplied from the top end of the tube 223 to the bottom end through the center hole. A water inlet hose 25 is attached to the bottom end of the tube 223.

A water outlet tube 221 is formed on the circular plate on the same side where the water inlet hose 25 is attached to the water inlet tube. The circular plate has an opening 2211 for the water outlet tube 221 so that water can flow through. A plurality of L-shaped ribs 222 are formed on the other side of the circular plate. The ribs 222 are mounted both on the water inlet tube 223 and the circular plate. A groove 2221 is formed on each rib 222.

The fixation device 23 comprises a circular plate having an O-ring 234 attached to the edge and a through hole formed in the center. A tubular body 232 having a diameter greater than that of the water inlet tube 223 of the set body 22 extends up from the through hole. A plurality of flanges 233 are formed on the tubular body 232. The flanges are to be inserted in the grooves 112 on the base of the outer casing 11. The set body 22 is then inserted in the fixation device 23 that is placed onto the filter cylinder 21. The L-shaped ribs 222 ensure that the water inlet tube is securely coupled in the tubular body 232. The edge of the filter cylinder 21 is bent inward to fix the fixation device 23. The filter cartridge 2 is thus formed.

As illustrated in FIGS. 2 and 3, while the filter cartridge 2 is assembled with the coupling device 1, the flanges 233 of the filter cartridge 2 is pushed against the outer casing 11 and inserted into the grooves 112 of the outer casing 11. The filter cartridge 2 is then rotated with an appropriate angle so that the flanges 233 are no longer lined up with the grooves. Therefore, the fixation device 23 is fixed on the outer casing 11, and the filter cartridge 2 and the coupling device 1 are firmly affixed together.

The water inlet tube 223 extends out of the fixation device 23 and pushes against the valve member 14 to overcome the elastic force of the elastic element 15 so that water from the water inlet opening 131 can pass through the central through hole 121 of the inner casing 12 and side-wall through holes 142 of the value member 14 into the water inlet tube 223. Water comes out of the water inlet hose 25, flows through the filtering material 3 and then enters the water outlet tube 221. The top opening 2211 of the water outlet tube 221 allows water to flow into the interior of the tubular body 232 and pass through the hole 123 of the inner casing 12. Finally, water comes out of the water outlet opening 132 of the cover body 13 is ready for drinking.

From the above detailed description of the filter device in accordance with the present invention, it can be seen that the disadvantages of a conventional filter device have been overcome. When a filter cartridge 2 is loosened or not connected, the valve member 14 prevents water from entering the water inlet tube 223 by completely blocking the central through hole 121. When a filter cartridge 2 is connected, the elastic element 15 is compressed to open the central hole 121 and thus allows water to go through.

While the structure and features of the present invention have become more apparent from the above detailed description and illustration, it will be understood by a person skilled in the art that various changes and detail may be made without departing from the spirit and scope of the invention.

What is claimed is:

1. A filter device for a water filter comprising:
   a coupling device including:
      an outer casing comprising a hollow interior space and a base, said base having a hole and a plurality of grooves adjacent to the hole;
      an inner casing comprising a hollow interior space, a water outlet hole and a top plate, said top plate having a reversed conical central through hole;
      a valve member comprising a head part having a conical structure matching said reversed conical central through hole, a hollow rod having side-wall through holes and an annular flange, said head part and said hollow rod being fastened together from two sides of said top plate;
      an elastic element being placed between said head part and said annular flange for controlling said valve member, said central through hole being completely blocked by said head part if said elastic element is not compressed;
      and a cover body having a water inlet opening and a water outlet opening;
      wherein said inner casing is affixed to said cover body and inserted in the hollow interior space of said outer casing so that said cover body covers said outer casing and a water outlet path is formed from said water outlet hole to said water outlet opening;
   and a filter cartridge including:
      a set body comprising a set plate, a water inlet tube passing through said set plate, a water outlet tube having an opening on said set plate and plurality of ribs mounted on said set plate and said water inlet tube, said water inlet tube being connected with a water inlet hose, and said ribs each having a groove;
      a fixation device comprising a tubular body having a plurality of flanges formed thereon, said flanges being matched with said grooves of said base of said outer casing, and said tubular body having a central hole through which said water inlet tube is inserted for securely fixing and coupling said set body to said fixation device by said ribs;
      a filter cylinder comprising filtering material;
      and a base body connecting said filter cylinder;
      wherein said fixation device is affixed to and covers said filter cylinder;
   wherein a water outlet path is formed from said water outlet tube through the central hole of said tubular body and said water outlet hole to said water outlet opening;

and said elastic element is compressed to form a water inlet path from said water inlet opening through said side-wall through holes, said hollow rod and said water inlet tube to said water inlet hose when said fixation device is inserted into the hole of said base of said outer casing and rotated for locking the flanges of said tubular body within said outer casing.

2. The filter device according to claim 1, wherein said head part and the interior surface of said hollow rod have matched threads for being screwed and fastened tightly together.

3. The filter device according to claim 1, wherein said base body is secured within said filter cylinder by bending one end of the side wall of said filter cylinder inward.

4. The filter device according to claim 1, wherein said fixation device is affixed to said filter cylinder by bending one end of the side wall of said filter cylinder inward.

* * * * *